United States Patent Office 3,114,784
Patented Dec. 17, 1963

3,114,784
SEPARATION OF XYLENE ISOMERS WITH ALKYLIDENE-BIS-BENZAMIDES
Anthony T. Coscia, South Norwalk, Conn., assignor to American Cyanamid Company, New York, N.Y., a corporation of Maine
No Drawing. Filed Nov. 3, 1960, Ser. No. 66,894
4 Claims. (Cl. 260—674)

This invention relates to a novel class of benzamides, and to methods for their preparation. More particularly, it relates to novel 2,2-alkylidene bis-benzamides represented by the following formula:

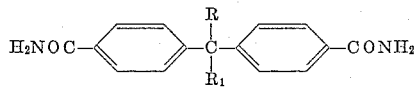

in which R and $R_1$ are alkyl groups containing from 1 to 2 carbon atoms, and to their use as clathrating agents.

The new class of bis-benzamide compounds may be characterized as white to tan solids soluble in polar solvents, such as methanol, ethanol and acetone. The compounds, which hereinafter will be described with particularity, are useful as clathrating agents effective in the separation, for example, of isomeric hydrocarbon mixtures.

According to the present invention, the class of compounds defined above may be conveniently and readily prepared by reacting either a 2,2-alkylidene-bis (benzoic acid) or the corresponding acid halide with at least two mols of ammonia gas per mol of the acid or acid halide in any suitable reaction vessel. As illustrative of the bis compounds useful herein may be mentioned: 2,2-propylidene-bis (p-benzoic acid), 2,2-butylidene-bis (p-benzoic acid), 2,2-pentylidene-bis (p-benzoic acid) and 2,2-butylidene-bis (p-benzoyl chloride).

Alternatively, the novel compounds of the invention may be prepared by reacting a 2,2-alkylidene-bis (benzoic acid nitrile), such as 2,2-butylidene-bis (p-benzonitrile), with at least two or more mols of hydrogen peroxide, and preferably in the presence of alcoholic alkali metal hydroxide at temperatures within the range of from about 20° C. to 45° C., and thereafter recovering the corresponding bis-benzamide compound.

Advantageously, conversion of the bis benzoic acids to the corresponding bis-amides is preferably carried out in an autoclave at elevated temperatures ranging from about 200° C. to about 290° C. Under these conditions of temperature and pressure, the reaction is completed within about five hours or less. Usually, one or two hours are required for complete reaction. However, if the reaction is carried out in a vessel at atmospheric pressure, the time for reaction is substantially increased, usually twenty-four hours or longer.

Temperatures, usually in the range of from 20° C. to 30° C., are employed when reacting the acid chlorides of bis-benzoic acids. Usually, the reaction is completed within two hours in the absence of polar solvents. However, in their presence, the reaction is almost instantaneous.

The invention will be further defined by the following examples which are to be taken as illustrative only, and are not to be construed as being limitative. All parts are by weight, unless otherwise stated.

EXAMPLE 1

*Preparation of 2,2-Butylidene-Bis (p-Benzamide)*

57 parts of 2,2-butylidene-bis (p-benzoic acid) are charged to an autoclave provided with an inlet and an outlet port. Through the inlet port are introduced 25 parts of anhydrous ammonia gas and resultant mixture is heated for one hour at 225° C. The autoclave is then vented and permitted to cool. A quantitative yield of the bis-amide is recovered as a tan powder melting at about 110° C.

The product is insoluble in water but miscible in methanol, ethanol and acetone. Further, its infra-red (IR) spectra demonstrate the presence of diamides due to the absorption bands at 3350 cm.$^{-1}$ and 3200 cm.$^{-1}$ for amino groups and carbonyl groups (C=O) at 1655 cm.$^{-1}$.

EXAMPLE 2

*Preparation of 2,2-Pentylidene-Bis (p-Benzamide)*

Repeating the procedure of Example 1 in every material respect except that the butylidene bis (benzoic acid) and the reactants are heated in an autoclave for two hours. Quantitative yields of 2,2-pentylidene-bis (p-benzamide) are obtained, softening at 104° C. to 124° C.

EXAMPLE 3

*2,2-Propylidene-Bis (p-Benzamide)*

The procedure of Example 1 is repeated in every detail except that the butylidene-bis (benzoic acid) is replaced by 2,2-propylidene-bis (p-benzoic acid) and the reactants are heated for about two hours. 2,2-propylidene-bis (p-benzamide), melting at 105° C. to 110° C., is recovered in quantitative yields.

EXAMPLE 4

*Preparation of 2,2-Butylidene-Bis (p-Benzamide)*

To a solution containing 5 parts of 2,2-butylidene-bis (p-benzoic acid chloride) in 60 parts of cold absolute alcohol are added with mild stirring 80 parts of ice-cooled absolute ethanol saturated with anhydrous ammonia. The mixture is permitted to stand undisturbed for twenty-four hours. Resultant ammonium chloride is filtered and removed from the solution. The alcohol is next distilled and a residual syrup is obtained. Trituration with methanol and drying under a reduced pressure of about 1 mm. Hg gives the butylidene-bis (p-benzamide) as a white amorphous solid in high yields. The product melts at about 110° C.

EXAMPLE 5

*Preparation of 2,2-Butylidene-Bis (p-Benzamide)*

To a solution of 5.5 parts of 2,2-butylidene-bis (p-benzonitrile) in 60 parts of ethyl alcohol there are added 25 parts of 30% aqueous hydrogen peroxide solution. 3.2 parts of a 3 N aqueous solution of sodium hydroxide are added slowly thereto and the resultant solution is heated to 45° C. to 50° C. for about five hours. On neutralization with dilute sulfuric acid, a white precipitate of 2,2-butylidene-bis (p-benzamide) is noted. When the latter is washed with water and dried over potassium carbonate, an 85 per cent yield of white bis-amide, melting at 105° C. to 109° C., is obtained.

EXAMPLE 6

This example will illustrate the utilization of the butylidene bis-amides in effecting the selective separation of isomeric hydrocarbon compounds.

To a solution containing 1 part of 2,2-butylidene bis-benzamide, prepared by the process of Example 1 above, and 15 parts of ethyl alcohol, there are added thereto 4 parts of a mixture of xylene isomers having the following composition:

|   | B. P., ° C. |
|---|---|
| 40%—meta xylene | 139.1 |
| 30%—para xylene | 138.5 |
| 30%—ortho xylene | 144.4 |

The above mixture is then heated to about 100° C. for about ten minutes. Resultant solution is next cooled to about 25° C. Crystals separated from the solution are collected. After drying again at 70° C. and 0.2 mm. Hg pressure for three hours, recovered crystals melted at 132° C. to 140° C.

Heating the aforementioned crystalline product in the high vacuum of a mass spectrometer and analyzing its IR spectrum, it is observed that the host compound [2,2-butylidene-bis (p-benzamide)] contains the following composition:

30%—meta xylene

5%—para xylene

70%—ortho zylene

Replacing the butylidene bis-benzamide with either the propylidene or the pentylidene bis-benzamide as prepared in Examples 2 and 3 above, each may be substituted in the above example. Separation of the isomers is similarly accomplished.

EXAMPLE 7

Repeating Example 6 above in every detail except that 2,2-butylidene-bis (benzamide) is replaced by 2,2-butylidene-bis (p-benzoic acid). No inclusion and, therefore, no separation of the several isomers occurs.

EXAMPLE 8

To 7 parts of 2,2-butylidene-bis (p-benzamide) is added sufficient ethyl alcohol in a suitable reaction vessel and the mixture then heated to 80° C. A 1:1 mixture of o-bromotoluene and p-bromotoluene having boiling points of 182° C. and 184° C., respectively, is next added to the aforementioned hot solution. Upon cooling to room temperature, a crystalline mass of the bis-amide separates in quantitative yields. Analysis of the crystals employing infra-red spectroscopy, demonstrates that 75 to 85 percent of the ortho isomer had been included in the bis-amide, but that only 15 to 25 percent of the para isomer is accommodated by the same bis-amide. The latter ortho and bromotoluenes are next separated from the crystals of the bis-amide by heating the latter to about 150° C. under 10 mm. Hg pressure.

I claim:

1. A process for effecting the separation of xylene isomers from a mixture thereof which comprises: incorporating the bis-amide represented by the formula:

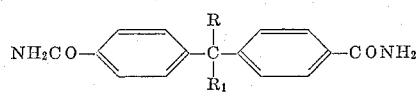

where R and $R_1$ are each a radical selected from the group consisting of methyl and ethyl, into a xylene hydrocarbon mixture comprising 40% m-xylene, 30% o-xylene and 30% p-xylene to obtain a solid mass comprising essentially the bis-amide and the bulk of said o-m-xylenes in said hydrocarbon mixture, separating said solid mass from the solution, and thereafter recovering a mixture from said solid mass consisting essentially of ortho and meta xylenes to the substantial exclusion of the para-xylene isomer.

2. A process according to claim 1 in which the bis-amide is 2,2-propylidene-bis (p-benzamide).

3. A process according to claim 1 in which the bis-amide is 2,2-butylidene-bis (p-benzamide).

4. A process according to claim 1 in which the bis-amide is 2,2-pentylidene-bis (p-benzamide).

References Cited in the file of this patent

UNITED STATES PATENTS

| | | |
|---|---|---|
| 2,421,030 | Mahan | May 27, 1947 |
| 2,551,891 | Martin et al. | May 8, 1951 |
| 2,756,221 | Caldwell | July 24, 1956 |
| 2,828,339 | Caldwell et al. | Mar. 25, 1958 |
| 2,840,621 | Corson et al. | June 24, 1958 |
| 2,842,604 | Van der Waals et al. | July 8, 1958 |
| 2,901,507 | Speeter et al. | Aug. 25, 1959 |
| 2,936,325 | Remes et al. | May 10, 1960 |
| 2,957,811 | Geiser | Oct. 25, 1960 |

OTHER REFERENCES

McMaster et al.: "Jour. Amer. Chem. Soc.," vol. 39, pages 103–109 (1917).

Beilstein's Handbuch der organischen Chemie, vol. 9, pages 929, 935 (1926).

Graf: "Journal für praktische Chemie.," vol. 138, pages 292–98, page 298 relied on (1933).

Noller: Chemistry of Organic Compounds, pages 238–239, published by W. B. Saunders Co., Philadelphia (1951).